United States Patent Office 3,184,936
Patented May 25, 1965

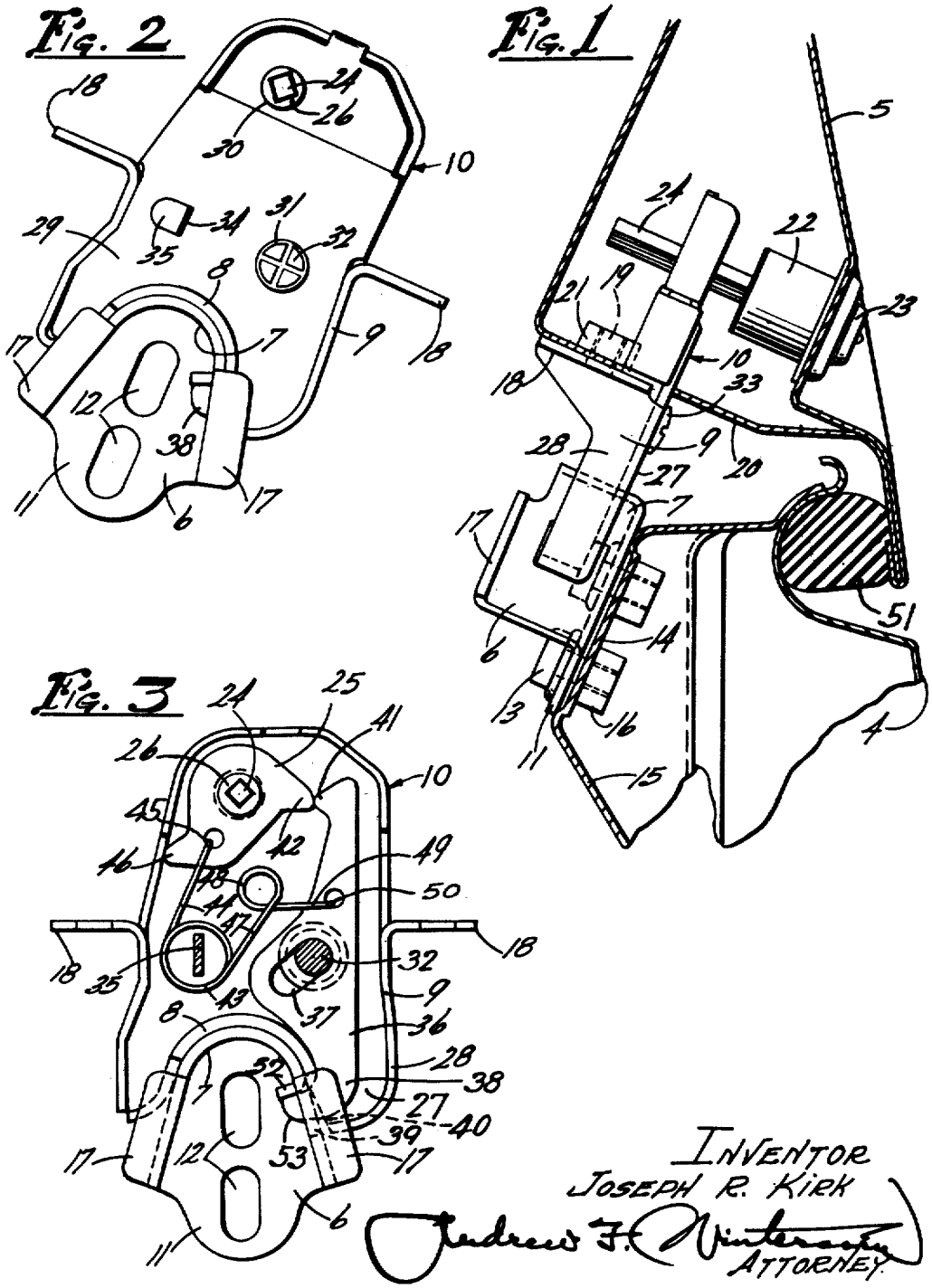

3,184,936
AUTOMOBILE REAR DECK LOCK
Joseph R. Kirk, Rockford, Ill., assignor to Atwood Vacuum Machine Company, Rockford, Ill., a corporation of Illinois
Filed Nov. 14, 1962, Ser. No. 237,483
5 Claims. (Cl. 70—151)

This invention relates to a new and improved automobile rear deck lock or latch structure.

The principal object of my invention is to provide a simpler and more practical as well as more economical latch structure of the kind mentioned than has been available heretofore, and one that by reason of the novel construction and arrangement of the spring pressed latch element relative to the keeper and control pawl permits the rear trunk lid to be closed regardless of the normal locked position of the pawl, which is spring pressed to locked position and adapted to be turned against spring pressure by means of a key in the barrel of the lock when the operator unlocks the lid.

An important advantage of the present latch structure over earlier ones is its theft-proof construction, it being well known that a tool like an ice pick entered by puncturing a hole in the lid could be used quite effectively with earlier constructions, because the more or less exposed latch element could be worked thereby, whereas with the present construction the spring pressed latch element is fully enclosed in a stamped sheet metal housing between a closely spaced rear wall and a front cover plate thereby making manipulation of the latch element by means of such a tool practically impossible.

The invention is illustrated in the accompanying drawing, in which:

FIG. 1 is a vertical section through the rear portion of an automobile rear trunk showing the rear deck lock or latch structure of my invention in side elevation;

FIG. 2 is a front view of the latch structure by itself, and

FIG. 3 is a view similar to FIG. 2 with the back plate removed to disclose the working parts.

The same reference numerals are applied to corresponding parts throughout these views.

Referring to the drawing, the reference numeral 4 designates the rear wall of the trunk or luggage compartment of an automobile, and the lid 5 suitably hinged at its upper end in the usual way to swing up and down to and from an open position in which access is permitted to the interior of the trunk. The keeper, indicated at 6, is a sheet metal stamping providing a generally semi-circular hollow dovetail 7 on the upper end that fits in a generally semi-circular mating recess 8 defined on the bottom portion of the housing or casing 9 of the rear deck lock or latch structure indicated generally by the reference numeral 10. The keeper 6 has an attaching web portion 11 provided with elongated slots 12 on its longitudinal center line to receive cap screws 13 for fastening the keeper onto a flat pad portion 14 defined on the inner wall 15 of the trunk or luggage compartment, the screws 13 being passed through holes in the pad portion 14, as indicated in FIG. 1, and receiving nuts 16, which when tightened, fasten the keeper 7 securely in place on the inside of the rear wall of the trunk. The longitudinal flanges indicated at 17 provided on opposite sides of the keeper 6 serve both for reinforcement of the keeper 6 and to retain the latch structure 10 against forward displacement from its proper position. The housing 9 of the latch structure 10 has ears 18 on opposite sides thereof with studs 19 projecting therefrom through holes in the inwardly projecting edge wall 20 on the bottom of the lid 5, as shown in FIG. 1, to receive nuts 21 for fastening the latch structure securely in place on the lid in proper centered relationship to the keeper 6 and also in proper relationship to the usual rotary type key-operated lock 22. The latter is mounted in the usual way in a hole provided therefor in the outer wall of the lid 5, so that the lid can be unlocked in the usual way by entry of a key in the rotatable barrel 23 to turn the square shaft 24 with the barrel and accordingly turn the pawl 25 that has a square axial hole through its hub portion 26 to receive the aforesaid square shaft 24. The housing 9 is of generally rectangular form and has a front wall 27 from which extend the side walls or flanges 28 that extend around the generally semi-circular recess portion 8 at the lower end, and the open front of the housing is closed by a cover plate 29 which has a circular opening 30 in register with and rotatably receiving the hub portion 26 of the pawl 25, and another circular opening 31 receiving one end of a stud 32 that is rigidly secured at its other end 33 in a hole in the front wall 27 by upsetting of the protruding end portion, the first mentioned end being also upset to secure the cover plate 29. A slot 34 in plate 29 has a lug 35 extending therethrough from the front wall 27 and bent over at right angles to further secure said plate.

The stud 32 provides pivotal and sliding support for the middle portion of the elongated latch element 36, which has an inclined slot 37 provided therein to receive said stud. The lower end 38 of the latch element is hook-shaped and arranged to engage in a slot 39 provided in the adjacent side wall of the keeper 6, the side wall 28 of housing 9 being cut away, as indicated at 40, for the projection of the hooked end 38 of the latch element from the dovetail recess 8 to engage in the slot 39 and thereby lock the lid 5. A triangular projection 41 is provided on the other end of the latch element 36 which in the locking position of the latch element is disposed with the tip thereof engaging the outer end of the radial tooth 42 on the pawl 25. A coiled spring 43 is loosely caged by means of the lug 35 between the front wall 27 of housing 9 and cover plate 29 and has one end thereof providing an arm 44 pivotally connected by a right angle bent end at 45 to pawl 25 tending normally to turn the pawl in a clockwise direction, as viewed in FIG. 3, such movement being limited by the engagement of tooth 46 against the side wall 28 of housing 9. Hence, when a key entered in barrel 23 of lock 22 is turned to unlock the lid, the pawl 25 is turned in a counterclockwise direction against the action of arm 44 of spring 43, and the spring tends to return the pawl 25 and the key to the initial position shown, corresponding to the locked position of the latch element 36. The other end of spring 43 provides an arm 47 which has either a coil 48 or a half-loop or just a bend formed intermediate the ends thereof so that the end portion 49 of this arm which is pivotally connected by a right angle bent end at 50 to the upper end portion of the latch element 36 above the pivot stud 32 is adapted to exert a downward pressure on the latch element 36.

In operation, the parts are arranged as seen in FIG. 3 when the lid 5 is locked. To unlock the lid, the operator enters the proper key in the barrel 23 of the rotary lock 22 and turns shaft 24 in a clockwise direction against the action of arm 44 of spring 43, thereby turning pawl 25 in the same direction (namely, counter-clockwise, as seen in FIG. 3), leaving the upper end 41 of latch element 36 free to oscillate with respect to pivot stud 32. Hence, the lower end 38 of latch element 36 is easily disengaged from a slot 39 in keeper 6 upon upward movement of the lid, which may be obtained by means of a handle on the lid or through spring action in the hinges mounting the lid on the trunk, or the upward thrust of the compressed rubber seal 51 interposed between the deck lid and automobile body proper, the retraction of the hooked end 38 of latch element 36 being accompanied by upward and lateral pivotal movement relative to stud 32 by reason of the inclination of slot 37. The inwardly bent lug 52 on the keeper 6 at the upper end of slot 39 provides an elongated bearing surface for engagement by the hooked end 38 of the latch element so as to provide smoother locking action and longer wear on both the keeper and the latch element. As soon as the hooked end 38 of the latch element is free of the keeper, the latch element 36, being under downward pressure of the end portion 49 of the arm 47 of the spring 43, returns to the position seen in FIG. 3, in readiness for the locking again of the lid. When the lid is closed the rounded lower corner 53 on the hooked end 38 of the latch element 36 first engages the semi-circular upper end portion 7 of the keeper 6 and the latch element 36 is accordingly cammed inwardly and upwardly out of the way against the action of spring 43 until the dovetail 7 is engaged fully in the dovetail recess 8, whereupon the spring 43 causes the latch element 36 to return to the locked position, the hooked end 38 snapping into place in slot 39 with an audible click. The lid cannot be opened by a thief using a tool like an ice pick, because even though the back wall of the trunk is pierced with such a tool in the vicinity of lock 22, and even if the back wall 27 of the housing 9 is also pierced, it is obvious that the thief cannot accomplish anything by so doing as there would be no opportunity of thereby disengaging the latch element 36 from the keeper, regardless of where the wall 27 of housing 9 happened to be pierced.

It is believed the foregoing description conveys a good understanding of the objects and advantages of my invention. The appended claims have been drawn to cover all legitimate modifications and adaptations.

I claim:

1. A latch structure of the character described comprising an upright support, an upright elongated latch element slidably pivoted intermediate its ends on said support by means of a pivot pin on the support entered in an elongated inclined slot provided in said latch element extending transversely thereof so as to allow compound movement of said latch element, namely, laterally and upwardly and return, the lower end of said latch element having a keeper-engaging projection extending laterally therefrom in one direction relative to said pivot, the projection having an outer edge with acute angle inclination oppositely with respect to said slot, the upper end of said latch element having a generally V-shaped lateral projection in the same direction as said keeper-engaging projection, a rotary locking pawl having a narrow lateral projection extending in the opposite direction toward the last-mentioned lateral projection and by blocking engagement of the outer end of the pawl projection with the outer end of the latch projection holding said latch element in locked position, said pawl being normally disposed in blocking relation to said latch element but being rotatable to a retracted position withdrawing its projection from blocking relationship to the lateral projection on said latch element, and spring means urging said locking pawl to turn normally to locked position and urging said latch element endwise and to turn so as to engage the keeper-engaging projection under the keeper.

2. A latch structure as set forth in claim 1, wherein said spring means comprises a single coiled torsion spring carried on said support having one end portion which provides an arm that is pivotally connected with said pawl tending to turn it in a locking direction and hold it normally in locked position, and having another end portion providing an arm that is pivotally connected with said latch element urging it downwardly and to turn so as to engage the keeper-engaging projection under the keeper.

3. A latch structure as set forth in claim 1, wherein said spring means comprises a single coiled torsion spring carried on said support having one end portion which provides an arm that is pivotally connected with said pawl tending to turn it in a locking direction and hold it normally in locked position, and having another end portion providing an arm with a loop formed therein intermediate its ends from which the outer end portion of the arm extends in substantially right angle relationship to said latch element and has pivotal connection with it above and on one side of the pivot axis urging said latch element downwardly and to turn so as to engage the keeper-engaging projection under the keeper.

4. Latch mechanism of the character described comprising an upright generally rectangular housing having a back wall and enclosing side walls, a front cover plate secured in spaced parallel relation to said back plate, said housing having a dovetail recess defined in the lower end portion thereof adapted to receive a complementary shaped keeper in interfitting dovetail relationship thereto, a key-operated lock having a rotary barrel fixedly mounted behind and adjacent the upper end portion of said housing and including a shaft turnable with the barrel and extending forwardly into said housing, a rotary locking pawl in said housing connected to turn with said shaft and having a lateral projection on one side thereof, an upright elongated latch element slidably pivoted intermediate its ends in said housing by means of a pivot pin in said housing entered in an elongated inclined slot provided in said latch element transversely thereof for compound movement, namely, laterally and upwardly and return, the lower end of said element having a keeper-engaging projection extending laterally therefrom in one direction relative to said pivot and in the opposite direction with respect to the pawl projection through an opening provided in one side of said dovetail recess and having a lower edge with acute angle inclination oppositely with respect to said slot, the upper end of said element having a generally V-shaped lateral projection which extends in the same direction as the keeper engaging projection and is disposed in registering blocking relationship with the pawl projection, said pawl being rotatable with said shaft to non-blocking relationship to said element, and spring means urging said locking pawl to turn normally to locked position and urging said latch element endwise and to turn so as to engage the keeper-engaging projection under the keeper.

5. A latch mechanism as set forth in claim 4 wherein said spring means comprises a single coiled torsion spring housed between and parallel to said back wall and cover plate having one end portion which provides an arm that is pivotally connected with said pawl tending to turn it in a locking direction and hold it normally in locked position, and having another end portion providing an arm that is pivotally connected with said latch element urging it downwardly and to turn so as to engage the keeper-engaging projection under the keeper.

References Cited by the Examiner
UNITED STATES PATENTS

| 2,637,581 | 5/53 | Roethel | 292—229 |
| 2,693,099 | 11/54 | Vigmostad. | |
| 2,930,645 | 3/60 | Dall. | |
| 3,010,749 | 11/61 | Brissette et al. | 292—27 |

FOREIGN PATENTS 1,216,068  11/59  France.

M. HENSON WOOD, JR., *Primary Examiner.*